United States Patent
Lindsay et al.

(10) Patent No.: US 9,136,942 B2
(45) Date of Patent: Sep. 15, 2015

(54) TESTING OF ELEMENTS USED IN COMMUNICATION LINKS

(71) Applicant: ClariPhy Communications, Inc., Irvine, CA (US)

(72) Inventors: Thomas A. Lindsay, Brier, WA (US); Norman L. Swenson, Mountain View, CA (US); Paul Voois, Ladera Ranch, CA (US)

(73) Assignee: ClariPhy Communications, Inc., Irvine, CA (US)

( * ) Notice: Subject to any disclaimer, the term of this patent is extended or adjusted under 35 U.S.C. 154(b) by 0 days.

(21) Appl. No.: 13/952,774

(22) Filed: Jul. 29, 2013

(65) Prior Publication Data

US 2014/0161440 A1    Jun. 12, 2014

Related U.S. Application Data

(63) Continuation of application No. 12/705,973, filed on Feb. 15, 2010, now Pat. No. 8,498,535, which is a continuation of application No. 11/427,765, filed on Jun. 29, 2006, now Pat. No. 7,664,394.

(60) Provisional application No. 60/695,926, filed on Jun. 30, 2005, provisional application No. 60/747,398, filed on May 16, 2006.

(51) Int. Cl.
    *H04B 10/073*      (2013.01)
    *H04B 10/66*      (2013.01)
    *H04B 17/00*      (2015.01)
    *H04B 17/345*      (2015.01)

(52) U.S. Cl.
     CPC .............. *H04B 10/073* (2013.01); *H04B 10/66* (2013.01); *H04B 17/345* (2015.01)

(58) Field of Classification Search
     USPC ................................................ 398/16, 24–26
     See application file for complete search history.

(56) References Cited

U.S. PATENT DOCUMENTS 4,373,115 A * 2/1983 Kahn .............................. 381/15
4,921,347 A     5/1990 Wong et al.
(Continued)

FOREIGN PATENT DOCUMENTS

EP      1 394 969      3/2004
JP      2001-308788      11/2001
(Continued)

OTHER PUBLICATIONS

Agrawal, G., "Fiber-Optic Communication Systems, Third Edition," 2002, pp. 106-118.
(Continued)

*Primary Examiner* — Nathan Curs
(74) *Attorney, Agent, or Firm* — Fenwick & West LLP

(57) ABSTRACT

A receiver for a communications link includes a receiver module and a host receiver. These two components can be tested independently. In one embodiment, the receiver module is characterized with respect to noise and distortion. The noise performance can be determined by comparing input and output signals of the receiver module, to determine the relative noise of the receiver module. The distortion performance can be determined by comparing the distortion of input and output signals of the receiver module, using a reference host receiver that includes an equalizer. The host receiver can be tested by using a reference receiver module.

20 Claims, 5 Drawing Sheets

(56) References Cited

U.S. PATENT DOCUMENTS

| | | |
|---|---|---|
| 5,239,481 A | 8/1993 | Brooks et al. |
| 5,272,723 A | 12/1993 | Kimoto et al. |
| 5,475,518 A | 12/1995 | Karaki |
| 5,579,145 A | 11/1996 | Bogdan et al. |
| 5,652,668 A | 7/1997 | Aulet et al. |
| 5,774,242 A | 6/1998 | O'Sullivan et al. |
| 6,081,509 A | 6/2000 | Magiros et al. |
| 6,191,854 B1 | 2/2001 | Grasso et al. |
| 6,229,631 B1 | 5/2001 | Sato et al. |
| 6,233,073 B1 | 5/2001 | Bowers et al. |
| 6,259,543 B1 | 7/2001 | Golovchenko et al. |
| 6,314,147 B1 | 11/2001 | Liang et al. |
| 6,330,381 B1 | 12/2001 | Lu et al. |
| 6,377,552 B1 | 4/2002 | Moran, III et al. |
| 6,385,552 B1 | 5/2002 | Snyder |
| 6,477,311 B2 | 11/2002 | Ishizaka |
| 6,480,067 B1 | 11/2002 | Kobayashi et al. |
| 6,560,720 B1 | 5/2003 | Chirashnya et al. |
| 6,563,622 B2 | 5/2003 | Mueller et al. |
| 6,580,531 B1 | 6/2003 | Swanson et al. |
| 6,590,644 B1 | 7/2003 | Coin et al. |
| 6,694,104 B1 | 2/2004 | Caplan et al. |
| 6,768,577 B2 | 7/2004 | Eggleton et al. |
| 6,832,051 B2 | 12/2004 | Lu et al. |
| 6,865,343 B1 | 3/2005 | Bierhoff et al. |
| 6,956,642 B2 | 10/2005 | Franke et al. |
| 7,062,166 B2 | 6/2006 | Jacobowitz et al. |
| 7,095,956 B2 | 8/2006 | Levandovsky et al. |
| 7,102,739 B2 | 9/2006 | Endo et al. |
| 7,110,449 B2 | 9/2006 | Heo et al. |
| 7,154,924 B2 | 12/2006 | Sanchez |
| 7,161,666 B2 | 1/2007 | French et al. |
| 7,181,146 B1 | 2/2007 | Yorks |
| 7,187,435 B2 | 3/2007 | Franke et al. |
| 7,233,962 B2 | 6/2007 | Summerfield et al. |
| 7,263,287 B2 | 8/2007 | Xu |
| 7,280,765 B2 | 10/2007 | Chowdhury et al. |
| 7,363,562 B2 | 4/2008 | Waschura et al. |
| 7,389,045 B2 | 6/2008 | Fee |
| 7,389,470 B2 | 6/2008 | Heo et al. |
| 7,406,266 B2 | 7/2008 | Mahgerefteh et al. |
| 7,496,133 B2 | 2/2009 | Fujimori et al. |
| 7,643,752 B2 * | 1/2010 | Swenson et al. ........ 398/26 |
| 7,664,394 B2 * | 2/2010 | Lindsay et al. ........ 398/25 |
| 8,009,981 B2 * | 8/2011 | Swenson et al. ........ 398/16 |
| 8,111,986 B1 | 2/2012 | Lindsay |
| 8,254,781 B2 | 8/2012 | Lindsay et al. |
| 8,498,535 B2 * | 7/2013 | Linsday et al. ........ 398/25 |
| 2001/0035994 A1 | 11/2001 | Agazzi et al. |
| 2001/0035997 A1 | 11/2001 | Agazzi |
| 2002/0167703 A1 | 11/2002 | Merritt |
| 2002/0172458 A1 | 11/2002 | Downie |
| 2003/0058509 A1 | 3/2003 | Webb et al. |
| 2003/0123884 A1 | 7/2003 | Willner et al. |
| 2003/0175036 A1 | 9/2003 | Mamyshev et al. |
| 2004/0228635 A1 | 11/2004 | Price |
| 2005/0084270 A1 | 4/2005 | Caplan et al. |
| 2005/0191059 A1 | 9/2005 | Swenson et al. |
| 2005/0271394 A1 | 12/2005 | Whiteaway et al. |
| 2006/0067688 A1 | 3/2006 | Inman et al. |
| 2006/0291869 A1 | 12/2006 | Lindsay et al. |
| 2007/0064775 A1 | 3/2007 | Petre et al. |

FOREIGN PATENT DOCUMENTS

| | | |
|---|---|---|
| JP | 2004-336707 | 11/2004 |
| JP | 2005-513860 | 5/2005 |
| WO | WO 02/09313 | 1/2002 |
| WO | WO 03/052977 | 6/2003 |

OTHER PUBLICATIONS

Bhoja, S., "Channel Metrics for EDC-based 10GBASE-LRM," Big Bear Networks, IEEE 802.3aq Task Force, Jul. 2004, pp. 1-15, [Online] [Retrieved on Nov. 8, 2011] Retrieved from the Internet <URL:http://grouper.ieee.org/groups/802/3/aq/public/jul04/bhoja_1_0704.pdf>.

European Patent Office, Supplementary European Search Report, European Patent Application No. 05855576.4, Nov. 4, 2010, six pages.

European Patent Office, Supplementary European Search Report, European Patent Application No. EP 06737453.8, Dec. 10, 2009, seven pages.

IEEE Draft P802.3aq/D3.1, Draft Amendment to: IEEE Standard for Information technology—Telecommunications and Information exchange between systems—Local and metropolitan area networks—Specific requirements, Part 3: Carrier Sense Multiple Access with Collision Detection (CSMA/CD) Access Method and Physical Layer Specifications, Changes to IEEE Std 802.3—2002, Amendment: Physical Layer and Management Parameters for 10 Gb/s Operation, Type 10 GBASE-LRM, pp. 1-516.

Japanese Patent Office, Office Action, Japanese Patent Application No. 2007-548579, Oct. 27, 2009, eight pages.

Japanese Patent Office, Office Action, Japanese Patent Application No. 2007-548579, Sep. 7, 2010, four pages.

PCT International Search Report and Written Opinion, PCT Application No. PCT/US2006/025687, Mar. 5, 2008, ten pages.

PCT International Search Report and Written Opinion, PCT Application No. PCT/US2005/047041, Sep. 11, 2006, nine pages.

PCT International Search Report and Written Opinion, PCT Application No. PCT/US2006/08282, Apr. 26, 2007, six pages.

Swenson, N., et al., "Explanation of IEEE 802.3, clause 68 TWDP," Jan. 5, 2006, 4 pages, ClariPhy Communications, Inc., [online] [Retrieved on Nov. 11, 2011] Retrieved from the Internet <URL:http://ieee802.org/3/aq/public/tools/TWDP.pdf>.

Voois, P. et al., "The Effect of Decision Delay in Finite-Length Decision Feedback Equalization," *IEEE Transactions on Information Theory*, Mar. 1996, pp. 618-621, vol. 42, No. 2.

* cited by examiner

TESTING OF ELEMENTS USED IN COMMUNICATION LINKS

CROSS-REFERENCE TO RELATED APPLICATION(S)

This application is a continuation of U.S. patent application Ser. No. 12/705,973, "Testing of Elements Used in Communication Links," filed Feb. 15, 2010, which is a continuation of U.S. patent application Ser. No. 11/427,765, "Testing of Receivers with Separate Linear O/E Module and Host Used in Communication Links," filed Jun. 29, 2006, which claims the benefit under 35 U.S.C. §119(e) of each of the following U.S. Provisional Patent Application Ser. No. 60/695,926, "SFP+ Linear Module Receiver Specifications And Test Methodology," filed Jun. 30, 2005; and Ser. No. 60/747,398, "Method For Tradeoff Between Linear Optical Module Rx Distortion And Noise," filed May 16, 2006. The subject matter of all of the foregoing are incorporated herein by reference in their entirety.

BACKGROUND OF THE INVENTION

1. Field of the Invention

This invention relates generally to the testing of elements, such as receivers, used in communications links, for example fiber optic communications links. More specifically, in cases where an element, such as receiver, includes a linear front-end and a separate back-end (host) that includes equalization, this invention relates to separate testing of the front-end and/or back-end.

2. Description of the Related Art

Optical fiber is widely used as a communications medium in high speed digital networks, including local area networks (LANs), storage area networks (SANs), and wide area networks (WANs). There has been a trend in optical networking towards ever-increasing data rates. While 100 Mbps was once considered extremely fast for enterprise networking, attention has recently shifted to 10 Gbps, 100 times faster. As used in this application, 10 Gigabit (abbreviated as 10G or 10 Gbps or 10 Gbit/s) systems are understood to include optical fiber communication systems that have data rates or line rates (i.e., bit rates including overhead) of approximately 10 Gigabits per second. This includes, for example, LRM and SFF-8431, a specification currently under development by the SFF Committee that will document the SFP+ specifications for 10G Ethernet and other 10G systems. While 10G systems serve as convenient examples for the current invention, the current invention is not limited to 10G systems. Examples of other systems to which the current invention could be applied include Fibre Channel systems, which currently operate at speeds from 1 Gbps to 10 Gbps, as specified by the Technical Committee T11, a committee of the InterNational Committee for Information Technology Standards (INCITS).

Regardless of the specific data rate, application or architecture, communications links (including optical fiber communications links) invariably include a transmitter, a channel and a receiver. In an optical fiber communications link, the transmitter typically converts the digital data to be sent to an optical form suitable for transmission over the channel (i.e., the optical fiber). The optical signal is transported from the transmitter to the receiver over the channel, possibly suffering channel impairments along the way, and the receiver then recovers the digital data from the received optical signal.

Recent developments in 10G optical communications have included the use of Electronic Dispersion Compensation (EDC) in receivers to extend range. For example, the IEEE 802.3aq standards committee is developing a standard (10GBASE-LRM or simply LRM) for 10G Ethernet over multi-mode fiber over distances of up to 220 meters using EDC. This standard is in a draft state, currently documented in *IEEE Draft P802.3aq/D4.0, Draft amendment to: IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Physical Layer and Management Parameters for 10 Gb/s Operation, Type 10GBASE-LRM*, referred to herein as IEEE 802.3aq/D4.0 or LRM, and incorporated by reference. The use of EDC in the receiver allows communication over longer distances and/or use of lower cost components. Some of the added waveform distortions can be corrected in the EDC receiver. However, an EDC receiver generally requires linear signaling between the dispersion mechanism (e.g., the fiber) and the equalizer that performs the EDC function.

Standards play an important role in networking and communications. Since components in the network may come from different vendors, standards ensure that different components will interoperate with each other and that overall system performance metrics can be achieved even when components are sourced from different vendors. For example, standards for receivers can be used to ensure that, when compliant transmitters are combined with a compliant channel and a compliant receiver, the overall link will meet certain minimum performance levels. As a result, manufacturers of receivers typically will want to test their receivers for compliance with the relevant standards as part of their qualification or production processes.

In the context of approaches such as LRM, the receiver may be divided into a module that contains the O/E conversion (e.g., a photodetector) and a host for the module. For convenience, these will be referred to as the receiver module and host receiver, respectively. If the EDC capability resides in the host receiver, then the O/E receiver module preferably is linear. However, the O/E module and the host may come from different vendors. Alternately, a system integrator may purchase O/E modules from a supplier for integration into its own host. Regardless of how it is assembled, in order for the overall receiver to be compliant, the O/E receiver module and corresponding host receiver together must be compliant. Current standards such as LRM may define a single standard for the receiver as a whole, without allocating requirements between the receiver module and the host receiver. In addition, EDC drives the need for a linear O/E module but EDC is a relatively new proposal. Older standards may provide separate specifications for the O/E module and host, but they typically are oriented towards hard-limited O/E modules rather than linear ones. In hard-limited O/E modules, if the input signal is above a threshold (nominally set at the average value of the signal), the output is at a logic one (high) level; whenever the signal is below the threshold, the output it at a logic zero (low) level. Hard-limited O/E modules are not linear.

Thus, there is a need for a receiver testing and compliance measurement technique for communications links, including, for example, 10G optical fiber communications links, where the linear receiver module and the host receiver (which includes EDC) can be tested and qualified independently.

SUMMARY OF THE INVENTION

The present invention overcomes the limitations of the prior art by providing separate tests for elements of a communication link, such as the linear receiver module and the host receiver. In one embodiment, the element, such as a receiver module, is characterized with respect to noise and distortion. The noise performance can be determined by applying a test signal to the element under test, such as a receiver module under test, measuring the output waveform, and comparing the noise in the output to the noise in the input. The increase in noise is a measure of the noise added by the element, such as the receiver module. The noise measurements preferably do not use averaging (which would suppress noise effects) and preferably do use techniques that avoid the inclusion of (deterministic) distortion, such as using histograms on portions of the waveform that are "flat" or by subtracting the variance of the signal. In one embodiment, the noise metric is relative noise added by the element, such as the receiver module, denoted $RN_M$ where the subscript M refers to the element, such as the receiver module. Generically, relative noise in this case is defined as the reciprocal of Q factor, which is a measure of signal to noise performance. In an alternate embodiment, Q factor is used as the noise metric.

The distortion performance can be determined by using a reference receiver that includes an equalizer. In one embodiment, the distortion metric is based on a waveform and dispersion penalty (WDP). WDP for a signal is defined as the difference (in dB) between a reference signal to noise ratio (SNR), and the equivalent SNR at the slicer input of a reference decision feedback equalizer (DFE) host receiver for the signal. WDP is a measure of distortion in the signal. The distortion performance of the receiver module is characterized by a differential waveform and dispersion penalty ($dWDP_M$), which is the difference between the WDP of a test signal applied to the receiver module and the WDP of the resulting output from the receiver module. The distortion measurements (such as $dWDP_M$) preferably use averaging of the deterministic signal/waveform in order to avoid the effects of noise.

In one approach, a test signal is applied to the element under dest, such as a receiver module under test, and both the incoming test signal and the output from the element are sampled using standard test equipment. The captured waveforms are processed through a software simulation of the reference host receiver (which includes an equalizer) to yield estimates of the two WDP values. These in turn can be used to calculate $dWDP_M$ by their difference. The use of a standard software simulation of the reference host receiver avoids the difficulties inherent with a hardware receiver (although hardware references could also be used) and allows a more accurate and repeatable measurement.

The noise and distortion measurements can be combined in different ways to define a standard for the element, such as a receiver module. Using $RN_M$ and $dWDP_M$ as an example, one standard may set a maximum level for $RN_M$ and an independent maximum level for $dWDP_M$. As another example, the standard may define allowable tradeoffs between $RN_M$ and $dWDP_M$, where good performance of one parameter would allow relaxed performance of the other and vice versa. In one approach, a contour of constant bit error rate (BER) may be defined in $RN_M$-$dWDP_M$ space. Receiver modules that lie on this contour or have better performance are compliant. In yet another approach, the definition of $dWDP_M$ may include the effects of noise in the receiver module. In this approach, while the standard may be defined only in terms of $dWDP_M$, noise performance is also accounted for indirectly through the definition of $dWDP_M$. That is, defined in this way, $dWDP_M$ is a hybrid metric of distortion and noise.

The host receiver is tested in effect by using a reference element, such as a reference receiver module. If the standard specifies test signals for the element (i.e., at the input of the element), an intermediate test signal can be generated by adding effects of the element. The intermediate test signal can then be applied to test the host receiver. For example, if the standard puts maximum limits on the $RN_M$ and $dWDP_M$ of the element (for example, a receiver module), the test signal (which may already contain certain impairments) can be further degraded by these maximum amounts of noise and distortion. The resulting intermediate test signal can be applied to the host receiver. The BER (or other performance metric) of the host receiver might then be used to determine whether the host receiver complies with the standard.

Other aspects of the invention include methods and devices corresponding to the techniques described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
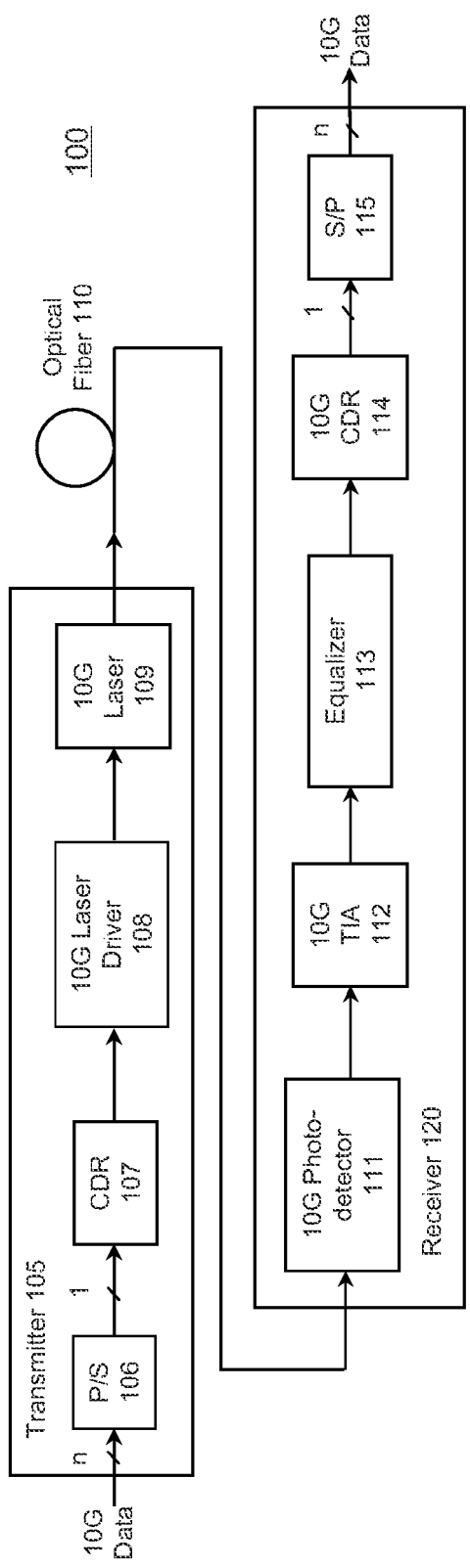
FIG. 1 is a block diagram of one implementation of a 10G optical fiber communications link with equalization.

FIG. 1 shows a 10G optical fiber communications link 100 with Electronic Dispersion Compensation (EDC). The link 100 includes a transmitter 105 coupled through optical fiber 110 (the channel) to a receiver 120. A typical transmitter 105 may include a serializer, or parallel/serial converter (P/S) 106 for receiving 10G data from a data source on a plurality of parallel lines and providing serial data to a 10G laser driver 108 via a clock and data recovery unit 107. The driver 108 then drives a 10G laser source 109, which launches the optical waveform carrying the digital data on optical fiber 110.

On the receive side, a typical receiver 120 includes a 10G photodetector 111 for receiving and detecting data from the optical fiber 110. The detected data is typically processed through a 10G transimpedance amplifier (TIA) 112, an equalizer (which applies the EDC correction) 113, and a 10G clock and data recovery unit 114. The components before the equalizer 113 preferably have an aggregate response that is linear in order to reduce degradation of the equalizer 113 performance.

The recovered data may then be placed on a parallel data interface through a serial/parallel converter (S/P) 115.

In many applications, the electronic and optical components at each end of the link are housed in a transceiver module. In some applications, these modules are fixed to a host circuit board, and in other applications they are "pluggable" modules that can be inserted into and removed from a cage (or socket) that is fixed to the host circuit card. Multi-Source Agreements (MSAs) have been developed to achieve some degree of interoperability between modules from different manufacturers. Example MSAs include XFP and SFP+, in which the 10 Gbps electrical I/O interface to the host is serial, and X2, XPAK, and XENPAK, in which the 10 Gbps electrical interface to the host is parallelized down to four lanes in each direction. In most current MSAs, the transceiver module may contain a fair number of components: parallel to serial converter, transmit CDR, laser driver and laser on the transmit side; and photodetector, transimpedance amplifier, equalizer, receive CDR and serial to parallel converter on the receive side.

Figure 2:
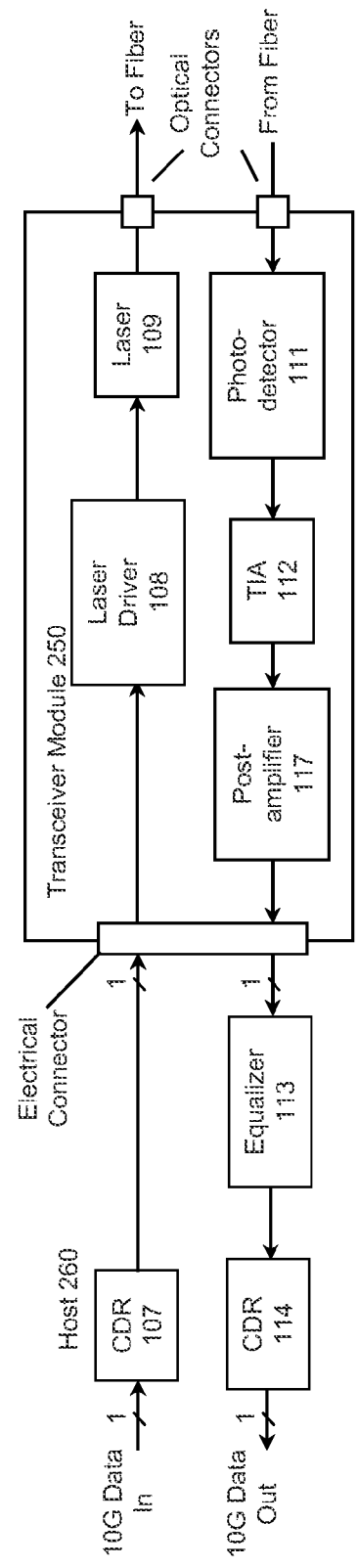
FIG. 2 is a block diagram of one implementation of an SFP+ transceiver module and corresponding host.

FIG. 2 shows a block diagram for a new MSA: SFP+ transceiver module 250. The SFP+ next-generation form factor promises to be smaller, burn less power, require fewer components and be less expensive. This is because the MSA dictates that fewer components are included in the transceiver module 250 itself: typically a laser driver 108 and laser 109 in the transmit path; and a photodetector 111, transimpedance amplifier 112 and maybe some type of post-amplifier 117 in the receive path. These modules are envisioned for systems in which other shared functions (such as P/S and S/P conversions, EDC and CDR) reside on the host circuit board 260. Moving functions outside the transceiver module 250 reduces size, cost and power consumption of the module.

In the context of MSAs such as SFP+, the receiver includes a portion of the transceiver module 250 and a portion of the host 260. For convenience, these portions will be referred to as the O/E receiver module (or just receiver module) and the host receiver, respectively, although the terms receiver module and host receiver are not intended to be limited to transceivers. The transceiver module 250 and host 260 may come from different vendors. Alternately, a system integrator may purchase transceiver modules 250 from a supplier. Therefore, it is desirable to be able to test the linear receiver module and the host receiver for compliance separately.

Figure 3:
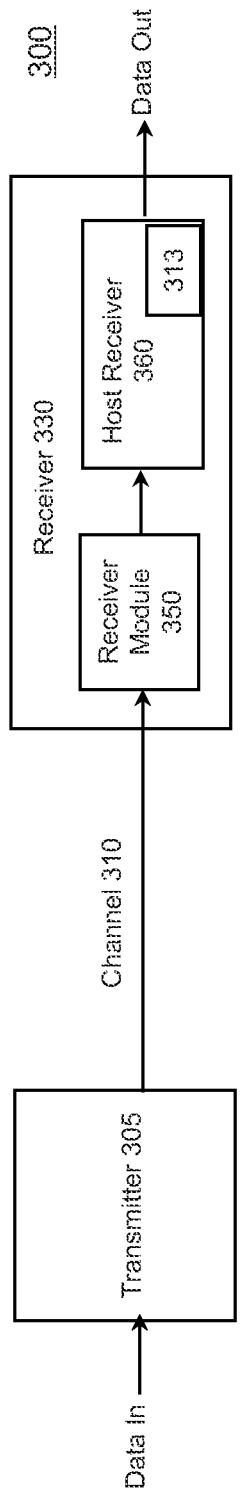
FIG. 3 is a block diagram of an example communications link suitable for use with the invention.

FIG. 3 is a more general block diagram of a communications link 300 suitable for use with the current invention. FIG. 3 shows a unidirectional link but most actual systems are bidirectional. The link 300 includes a transmitter 305 coupled through a channel 310 to a receiver 320. The receiver 320 includes a receiver module 350 coupled to a host receiver 360. The overall system 300 may suffer from various impairments in transmitting data from the transmitter 305 to the receiver 320. The host receiver 360 includes equalization 313 to correct for impairments arising from the channel 310. Accordingly, the receiver module 350 ideally is linear, for example a linear O/E converter. The transmitters 305, channels 310 and receivers 320 may be various types, depending on the end application. Microwave, RF, cable, and optical fiber are some examples of different media for the channel 310. Different types of modulation may be used by the transmitter 305. Some examples are on-off keying (most commonly NRZ), QAM, PSK, and OFDM. Similarly, the receiver 320 can also take the various forms corresponding to these different modulation formats. As described previously, the receiver module 350 and host receiver 360 may be provided independently. Accordingly, it is desirable to be able to independently test the receiver module 350 and the host receiver 360 for compliance with standards.

Described below is a specific example based on 10GBASE-LRM. The invention is not limited to this standard or this data speed. It can also be used for other 10G systems and/or for non-10G systems (e.g., 8G Fibre Channel, as will be documented in FC-PI-4). In this case, the ideal receiver module 350 is a noiseless, distortionless, linear O/E converter.

An ideal receiver module 350 will convert the incoming optical signal into an electrical signal with no change to the optical signal's waveshape or its signal-to-noise ratio (SNR). The output of the ideal receiver module 350 would be an electrical signal that bears a perfect linear relationship to the incoming optical signal (e.g., output electrical voltage is a linear function of the input optical intensity), with no added noise. However, any real receiver module will cause some amount of distortion of the waveshape and will add noise to the signal. Examples of distortion include filtering and non-linearities (any change in amplitude and/or phase of the signal spectrum, whether caused by a linear or nonlinear process). Thus, one way to characterize the quality of a receiver module is to quantify its noise performance and its distortion performance.

Figure 4:
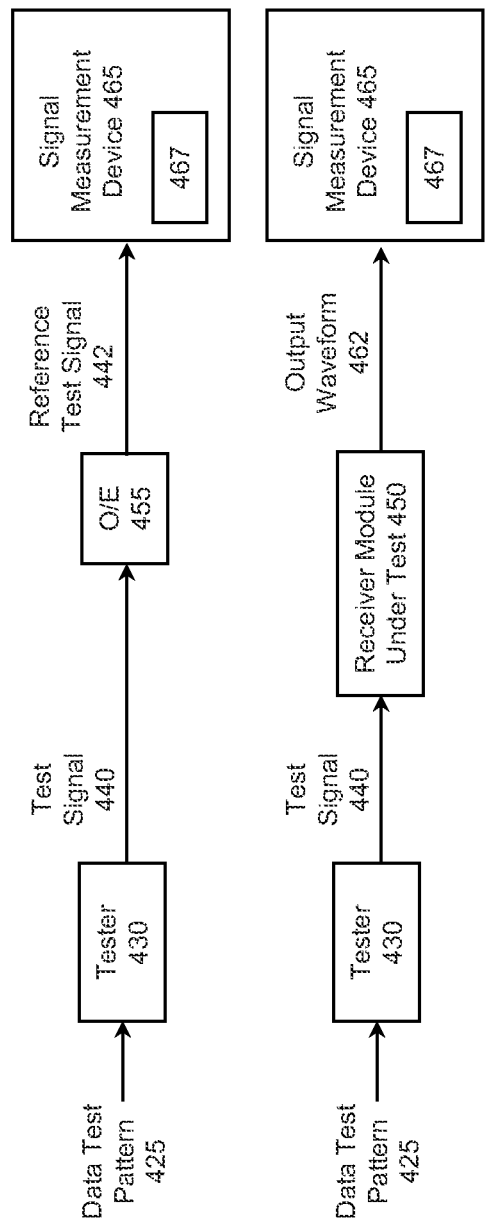
FIG. 4 is a block diagram of an example test system according to the current invention.

FIG. 4 is a block diagram of a test system according to the current invention. The purpose of the test system is to test the receiver module, for example for compliance with a specific standard. As shown in the bottom diagram of FIG. 4, a tester 430 generates a test signal 440, which is applied to the receiver module under test 450. The test signal 440 typically is based on a data test pattern (e.g., a test pattern of 1's and 0's). Many standards currently specify test signals for the receiver as a whole (i.e., receiver module plus host receiver) and these receiver test signals may be used as the test signal 440 for the receiver module. The receiver module 450 produces an output 462, which is measured by a signal measurement device 465, for example a sampling oscilloscope. The measured waveform 462 may be stored in some medium 467, for subsequent retrieval and processing. Alternately, the measured waveform 462 could be used immediately to determine the noise or distortion performance of the receiver module 450.

The test signal 440 may also be measured without the receiver module, as shown in the top diagram of FIG. 4, or otherwise processed and/or provided in a form suitable as a "reference" test signal 442 to allow comparison with the output waveform 462 produced by the receiver module.

For example, if the raw test signal 440 is optical and the receiver module 450 converts the incoming optical signal to an electrical output waveform 462, then the corresponding "reference" test signal measured in the top diagram could be an electrical version 442 of the optical test signal 440 where the O/E converter 455 is linear. The actual form of the "reference" test signal 442 and the processing applied to the test signal 440 to produce the "reference" test signal will vary depending on the specific measurement being made. The ideal O/E converter 455 shown in FIG. 4 is merely as an example.

The reference test signal 442 and output waveform 462 can be measured at different times. For example, the test signal 440 can be applied to the top diagram of FIG. 4 at a different time than when it is applied to the bottom diagram. Alternately, the test signal 440 may be split into two signals, one that produces the output waveform 462 and another that produces the reference test signal 442. These two signals 442 and 462 could be measured at the same time, for example by a dual input oscilloscope.

Figure 5:
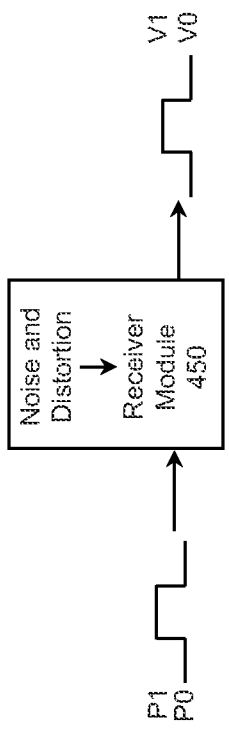
FIG. 5 illustrates a noise and distortion model for determining the noise and/or distortion performance of a receiver module.

FIG. 5 illustrates a noise and distortion model for determining the performance of the linear receiver module 450. In this example, the test signal is on-off keyed, NRZ switching between 0 and 1. Beginning with the noise performance, for the incoming signal, the 0 level has a mean optical power of P0 with rms noise of $\sigma_{P0}$, and the 1 level has a mean optical power of P1 with rms noise of $\sigma_{P1}$. Similarly, the output electrical signal has mean voltages levels of V0 and V1, and rms noise of $\sigma_{V0}$ and $\sigma_{V1}$, respectively for 0 and 1. The optical modulation amplitude (OMA) and voltage modulation amplitude (VMA) can then be defined as OMA=P1−P0 and VMA=V1−V0. The gain G of the linear receiver module is given by G=VMA/OMA.

In the context of 10GBASE-LRM measurements, in some cases, for example at the end of an optical fiber with dispersion, the values of P1 and P0 may not be well-defined. Accordingly, repeating low frequency square wave patterns are often used for testing. A typical low frequency square wave pattern might have eight contiguous 1's followed by eight contiguous 0's, where the actual number of 1's and 0's must be sufficiently long to allow the optical levels to settle to their steady state values. These test patterns are commonly referred to as OMA patterns 425. VMA measurements generally are made in a similar manner with the same patterns.

The noise performance at the input and output of the receiver module 450 can be defined by the Q factor (which is one measure of signal to noise)

$$Q_{in}=(P1-P0)/2\sigma_P=OMA/2\sigma_P$$

$$Q_{out}=(V1-V0)/2\sigma_V=VMA/2\sigma_V \quad (1)$$

Here, $\sigma_P$ is the RMS value of $\sigma_{P1}$ and $\sigma_{P0}$. That is, $\sigma_P = ((\sigma_{P1}^2 + \sigma_{P0}^2)/2)^{1/2}$. Similarly $\sigma_V$ is the RMS value of $\sigma_{V1}$ and $\sigma_{V0}$. (Note that Eqn. 1 defines the Q factor slightly differently from the usage in Eqn. 68-2 of 802.3aq. 802.3aq uses the linear average of $\sigma_{P1}$ and $\sigma_{P0}$ for $\sigma_P$. The two definitions are equivalent when $\sigma_{P1}=\sigma_{P0}$.) Now introduce the concept of relative noise RN as $$RN_x = 1/Q_x. \quad (2)$$

Applying this to the input and output signals yields $$RN_{out}=1/Q_{out}=2\sigma_V/VMA$$

$$RN_{in}=1/Q_{in}=\sigma_P/OMA \quad (3)$$

The objective is to determine the impairing effect that the receiver module has on $RN_{out}$. Let $\sigma_{M0}$ and $\sigma_{M1}$ be the noise introduced by the receiver module at its output, for the 0 and 1 levels, respectively, and let $\sigma_M$ be the RMS values of $\sigma_{M1}$ and $\sigma_{M0}$. Then, assuming that the input noise and the receiver noise are statistically independent $$(\sigma_V)^2=(G^*\sigma_P)^2+(\sigma_M)^2 \quad (4)$$

Multiplying each term by 4/(VMA)², substituting with Eqns. 3 for $\sigma_V$ and $\sigma_P$, and simplifying yields $$(RN_{out})^2=(RN_{in})^2+4(\sigma_M)^2/(VMA)^2 \quad (5)$$

The rightmost term is the impairment due to the noise added by the receiver module. Define the relative noise added by the receiver module as $$RN_M=2\sigma_M/VMA \quad (6)$$

Then, Eqn. 5 can be rearranged to yield $$RN_M=\text{sqrt}\{(RN_{out})^2-(RN_{in})^2\} \quad (7)$$

If the test pattern 440 is essentially noiseless, then $RN_{in} \approx 0$ and Eqn. 7 reduces to $$RN_M \approx RN_{out}=2\sigma_V/(VMA) \quad (8)$$

Eqn. 8 was developed under several simplifying assumptions but similar results can be developed without making the simplifying assumptions. The general result is that the noise contribution of the receiver module (expressed as $RN_M$ in this case) can be determined based on measurements of the output waveform 462, and possibly also measurements 442 of the incoming test signal 440 (for example if the incoming waveform is not relatively noiseless).

The receiver module 450 under test generates a corresponding output electrical signal 462, which is measured by a sampling oscilloscope 465. The output noise preferably is measured with the receiver module 450 operating in its normal range. For example, if the receiver module has automatic gain control, the incoming OMA pattern 440 should be set so that the receiver module 450 is operating in its intended range. Otherwise, the noise levels and bandwidth may not represent actual operation. The optical test pattern 440 can also be measured before passing through the receiver module, preferably using an appropriate optical head for O/E conversion (with a fourth-order Bessel-Thomson response in the case of LRM).

In one approach, $RN_M$ is determined based on a vertical histogram for the output voltage level for 1, and on a separate histogram for 0. Both the signal (Vx) and noise magnitudes ($\sigma_{Vx}$) are measured. In this approach, the histograms are located and set to avoid measuring variations in the deterministic portion of the signal. Preferably, a flat and stable portion of the waveform is used.

Another option for measuring the noise magnitude is the following. The variance of the entire test signal (both 0's and 1's together) is measured. This includes the variances of both the signal (including any deterministic distortions) and the noise. Secondly, the variance of the entire test signal with averaging turned on is measured. In this case, the variance includes the variance of only the signal (and deterministic distortions) since the noise will be suppressed by the averaging. The square root of the difference is calculated. The difference will be the variance due to the noise, and the square root will provide the rms value of the noise. This method for noise measurement assumes a singular noise value that is independent of logic level (consistent with the above derivation, when it is assumed that $\sigma_{X1}=\sigma_{X0}$).

As described above, the tester 430 preferably is essentially noiseless so that $RN_{out} \gg RN_{in}$. Such a source can be accomplished, for example as defined in FIG. 68-10 in 802.3aq with the Gaussian noise source disabled or simply not used, as illustrated in FIG. 68-13. In this case, Eqn. 8 can be used (assuming the other simplifications are correct). When it is not true that $RN_{out} \gg RN_{in}$, Eqn. 7 should be used.

Measurements that have instrumentation characteristics preferably are calibrated and/or compensated so that error is not introduced into the measurement. For example, a recommended approach for measuring the incoming optical test signal 440 includes measuring the measuring instrument 465's dark noise with no light entering the input. Designate the measured rms noise with no input as $\sigma_{Pdark}$. Similarly, for measurements of the output waveform 462, the oscilloscope 465's electrical noise can be measured with the input(s) terminated by a matching impedance (typically 50 ohms). Designate the measured rms noise with no input as $\sigma_{VNoSignal}$. Then, the terms $\sigma P$ and $\sigma V$ used above can be replaced by sqrt$\{(\sigma_P)^2-(\sigma_{Pdark})^2\}$ and sqrt$\{(\sigma_V)^2-(\sigma_{VNoSigna})^2\}$, respectively to compensate for the effects of instrument noise.

Figure 6:
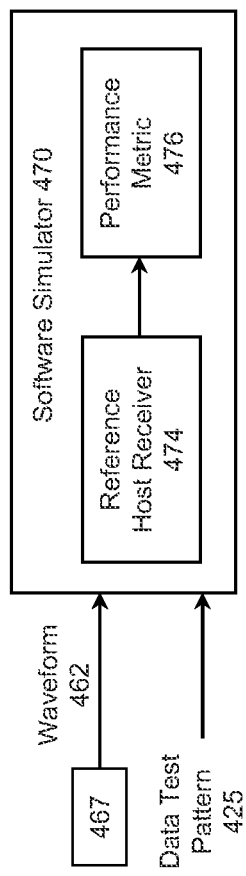
FIG. 6 is a block diagram of an example WDP test system according to the invention.

Moving now to the measurement of distortion introduced by the receiver module, FIG. 6 is a block diagram of a software test system according to the invention. In FIG. 6, a software simulator 470 accesses the waveform 462 captured from the output of the receiver module 450 under test. In this example, the waveform 462 was previously captured and stored in media 467, although that is not required. The simulator 470 is designed to simulate the equalizer of a reference host receiver 474. The software 470 processes the waveform 462 to simulate propagation of the waveform through the reference host receiver 474. A distortion metric 476 for the waveform is calculated based on the simulated propagation. The data test pattern 425 may be used as an input to the software simulator 470.

In one approach, a reference test signal 442, which represents the input to the receiver module under test 450, is also applied to the software simulator (in FIG. 6, replace output waveform 462 with input waveform 442) to yield a distortion metric for the input waveform. The relationship of the reference test signal 442 to the raw test signal 440 may vary, depending on the standard being tested. The distortion metric for the receiver module is determined by comparing the distortion metric for the input waveform 442 and that for the output waveform 462. The change in distortion metric is attributable to the receiver module 450 under test.

The following example describes a test methodology where the distortion metric is based on the Waveform and Dispersion Penalty (WDP). WDP is based on similar concepts as the TWDP metric developed for transmitters, but applied to other points in the communications link, including the receiver module. For a further description of TWDP, see U.S. patent application Ser. No. 11/316,115, "Testing Of Transmitters For Communication Links By Software Simulation Of Reference Channel And/Or Reference Receiver," filed Dec. 21, 2005, which is incorporated herein by reference. One difference from TWDP is that the internal dispersive stressor/channels in TWDP are removed and replaced with a no-dispersion identity channel, as described in LRM's text for calibration of the TP3 test signal in clause 68.6.9.3.

The WDP for a signal X is defined as $$WDP_X = SNR_{REF} - SNR_X (dBo) \quad (9)$$

where $SNR_{REF}$ is a reference signal to noise ratio (SNR), expressed in optical dB (dBo), and SNR is the equivalent SNR in dBo for a signal X measured at the slicer input of the reference decision feedback equalizer (DFE) receiver for the measured waveform after propagation through a reference host receiver. In this particular example, $SNR_{REF}$ is the SNR that would be realized by an ideal matched filter receiver if the received waveform were an ideal rectangular NRZ waveform with amplitude OMA and the receiver had additive white Gaussian noise (AWGN) of spectral density $N_0$.

The distortion metric for the receiver module is given by the Differential Waveform and Dispersion Penalty (dWDP)

$$dWDP_M = WDP_{out} - WDP_{in} (dBo) \quad (10)$$

where $WDP_{out}$ is the WDP for the signal 462 output by the receiver module 450 under test and $WDP_{in}$ is the WDP for the signal 442. In the case of LRM, the reference test signal 442 is produced by passing the raw test signal 440 through an O/E converter 455 with a predefined spectral response (specifically, a 7.5 GHz $4^{th}$-order Bessel-Thomson in the case of LRM). Substituting Eqn. 9 into Eqn. 10 yields $$dWDP_M = SNR_{in} - SNR_{out} (dBo) \quad (11)$$

where the two SNR values are the SNR measured at the slicer input of the reference host receiver for the input and output signals, respectively.

Figure 7:
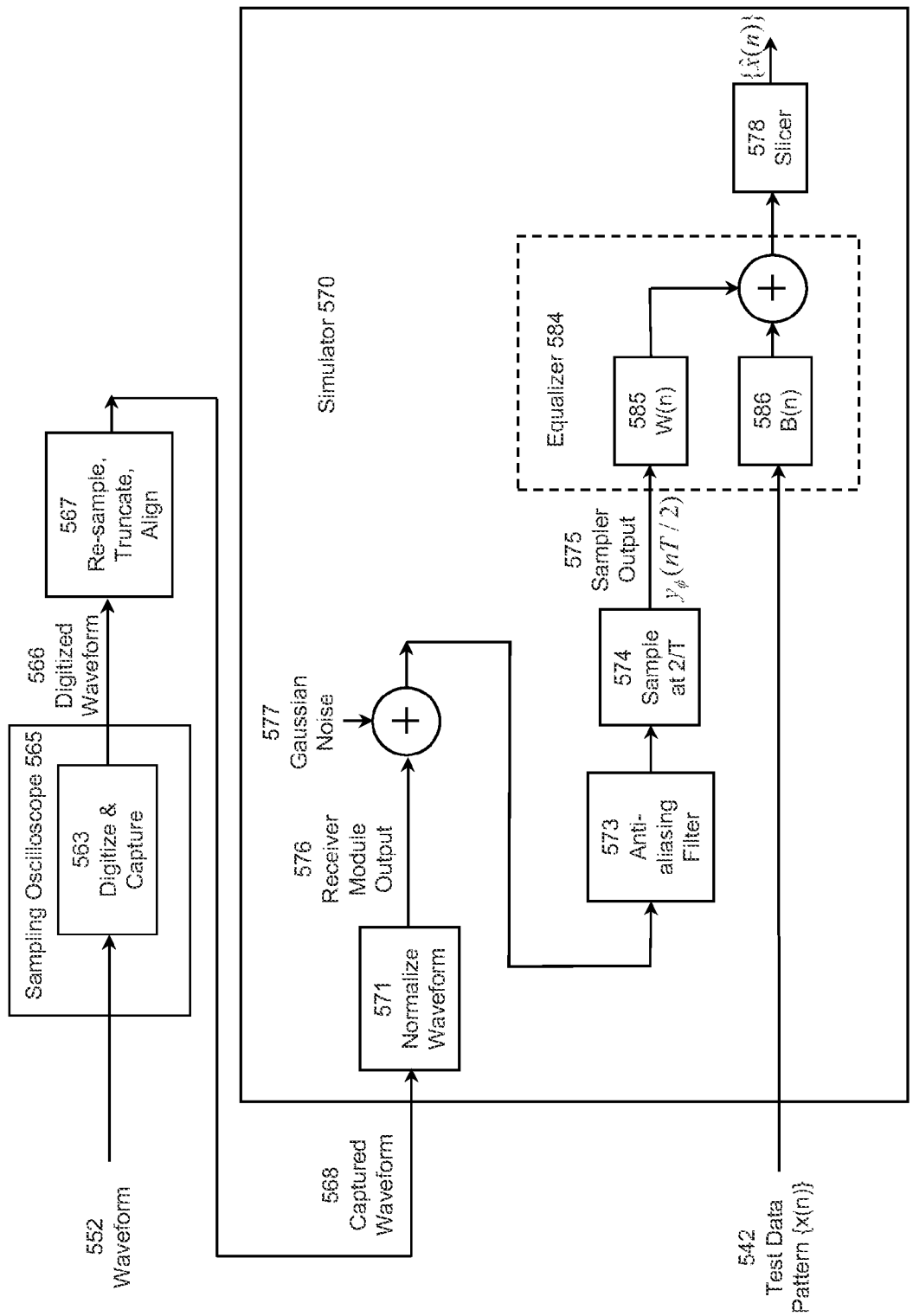
FIG. 7 is a block diagram of one model of a test system for determining the distortion performance of a receiver module.

In one approach, in a preferred embodiment, the two $SNR_X$ values (and hence also $dWDP_M$) is calculated by MATLAB code as illustrated in FIG. 7. The simulator 570 shown in FIG. 7 is similar to that used in the calculation of TWDP, but the internal dispersive channels in TWDP are replaced with an identity channel. Thus, the equalizer 584 effectively becomes the entire reference host receiver. Simulators other than the one shown in FIG. 7 can also be used. For example, an electrical channel can be added to the simulator to represent the reference host receiver's FR4 and/or IC package. The electrical channel could be added before or after the noise model 577.

In addition, various noise models 577 (e.g., different magnitudes and/or spectra) can be used to account for different effects and more than one noise source could be used. Generally speaking, there are multiple noise sources in a communications link, for example at the transmitter, fiber, receiver module and host receiver. The SNR at the slicer is affected by all of these noise sources, and the noise generated by these sources will pass through to the slicer with some magnitude and spectrum. All of these noise sources should be accounted for in order to get the most accurate result for WDP, and one approach is to use a noise model 577 that accounts for these different sources. In order to locate all the noise sources into one location in the host receiver model (577) in the most accurate manner, the effects of upstream filtering and gains/losses for each noise source should be accounted for in determining the aggregate noise power spectral density.

However, there typically is a tradeoff between accuracy and simplicity. More accurate models may introduce unwanted complexity. For example, in an alternate approach, the noise model 577 could be a single white noise source. This simplifies the model 577 and accuracy sufficient for testing could be retained in a number of ways. For example, the white noise source could be selected to have the same characteristics (with respect to the test) as the aggregate of the underlying noise sources. For example, the white noise source could be selected to have the same overall noise power or the same low frequency noise power density. Alternately, the white noise source could be selected to produce more conservative results than the aggregate underlying noise sources.

Waveform 552 (which is either the input signal 442 or output signal 462, depending on which SNR is being calculated) is digitized and captured 563. The oscilloscope is set to capture at least one complete cycle of the periodic signal 550 with at least seven samples per unit interval. The number of samples per unit interval is not critical as long as the sampling rate is high enough to capture the high frequency content of the signal without aliasing.

The inputs to the software simulator 570 include the following:

The captured waveform 568, which, in this specific example, is one complete cycle of the digitized waveform 566 with an integer number of samples per bit period or unit interval—e.g., one complete cycle of the waveform resulting from a periodic test signal. In some cases, the digitized waveform 566 is pre-processed (e.g., re-sampled, truncated and/or aligned with the underlying data test pattern, as necessary) to produce the captured waveform 568. In other cases, pre-processing may not be necessary and the digitized waveform 566 can be used directly as the captured waveform 568. In a preferred embodiment, the captured waveform 568 has 16 samples per unit interval. The number of samples per unit interval is not critical as long as the sampling rate is high enough to represent the high frequency content of the signal without aliasing.

One complete cycle of the test data pattern 542 used to generate the captured waveform 568. The test data pattern 542 and the captured waveform 568 are aligned (i.e., a rectangular pulse train based on the test data pattern 542 is aligned in time with the captured waveform 568 within one unit interval). The test data pattern 542 has period N (e.g., 511 for PRBS9) and one cycle is denoted $\{x(n)\}$, where $0 \le n \le N-1$.

The preprocessing steps of re-sampling, truncation to one complete cycle, and alignment with the test data pattern are shown performed in block 567 outside the simulator 570 and outside the sampling oscilloscope 565. Alternatively, some or all of these steps may be performed as part of the simulator 570, or inside the sampling oscilloscope 565, or as part of the digitization and capture 563.

In a preferred embodiment, the captured waveform 568 is processed by the software simulator 570, as follows:

1. The captured waveform 568 is normalized 571. The OMA (for input signal 442 or VMA for output signal 462) and baseline (steady state zero level) of the waveform 568 are either measured separately and entered as inputs to the algorithm, or alternatively they are estimated from the captured waveform. The zero-level (baseline) is subtracted from the waveform 568 and the waveform is scaled such that the resulting OMA (or VMA) is 1. Thus, the normalized waveform has a baseline of 0 and an OMA (or VMA) of 1. In the LRM case, $N_0$ is set such that $SNR_{REF}$ of Eqn. 9 is 14.97 dBo.

2. The normalized waveform plus noise 577 is passed through an antialiasing filter 573. A fourth-order Butterworth filter of bandwidth 7.5 GHz is used in this example. An alternative embodiment would omit the antialiasing filter 573 but would instead filter the Gaussian noise 577 before adding it to the receiver module output 576.

3. The output signal from the antialiasing filter 573 is sampled 574 at rate 2/T with sampling phase φ. An alternate embodiment using a matched filter and a rate 1/T sampler is described below. The sampler output 575 is denoted $y_\phi(nT/2)$, which has a deterministic component and a random component given by $$y_\phi(nT/2) = r(n) + \eta(n).$$

The sequence $\{r(n)\}$ is the deterministic sampled version of the filtered output of the receiver module; it is periodic with period 2N. The sequence $\{\eta(n)\}$ is a discrete-time noise sequence which is obtained by passing the AWGN through the anti-aliasing filter and sampling.

Figure 8:
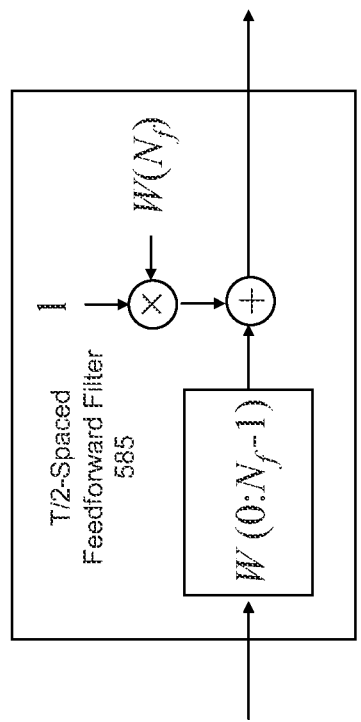
FIG. 8 is block diagram of a feedforward filter with a tap to adjust a constant offset.

4. The sampled signal is processed by a fractionally-spaced MMSE-DFE receiver 584 with $N_f$ feedforward taps (at T/2 spacing) 585 and $N_b$ feedback taps 586. For example, $N_f$ can be set to 14 and $N_b$ can be set to 5. The use of 14 feedforward taps and 5 feedback taps are example settings; the number of taps can be different depending on the desired capabilities of the reference DFE receiver. The feedforward filter is optionally augmented with an extra $(N_f+1^{th})$ tap that adjusts to optimize a constant offset, as shown in FIG. 8 and described more fully below. The feedforward and feedback tap coefficients are calculated using a least-squares approach that minimizes the mean-squared error at the slicer 578 input for the given captured waveform, assuming the noise power spectral density $N_0$ is set as described above.

FIG. 7 shows the channel and equalizer model used for the least-squares calculation. The reference DFE consists of a feedforward filter $\{W(0), \ldots, W(N_f-1)\}$, an optional constant offset coefficient $W(N_f)$ (as shown in FIG. 8), and a feedback filter $\{B(1), \ldots, B(N_b)\}$. A conventional DFE would feedback decisions $\{\hat{x}(n)\}$. In this case, the decisions are assumed to be correct and the decided bits are therefore replaced with the transmitted bits $\{x(n)\}$. While a finite length equalizer is shown in this example, an alternate embodiment would include an infinite length equalizer, performance of which could be computed analytically.

The feedback filter 586 is symbol spaced and strictly causal, feeding back the $N_b$ bits prior to the current bit $x(n)$. The input sequence on which the slicer makes decisions is denoted $\{z(n)\}$, where $$\begin{aligned}z(n) &= \sum_{k=0}^{N_f-1} W(k) y_\phi(nT + DT - kT/2) + W(N_f) - \sum_{k=1}^{N_b} B(k) x(n-k) \\ &= \sum_{k=0}^{N_f-1} W(k)(r(2n+2D-k) + \eta(2n+2D-k)) + W(N_f) - \\ &\quad \sum_{k=1}^{N_b} B(k) x(n-k)\end{aligned} \quad (12)$$

Eqn. 12 includes the term $W(N_f)$, which is the optional constant offset coefficient for automated offset compensation; without offset compensation, $W(N_f)$ would be absent (or set to 0). In Eqn. 12, D is an integer such that the number of anticausal T/2-spaced taps in the feedforward filter is 2D. While the feedforward filter is modeled as having anticausal taps, a practical equalizer would delay decisions by DT so that the overall system is causal. DT is referred to as the equalizer delay. Sometimes the equalizer delay is expressed as the number of feedforward anticausal taps, 2D.

The least-squares solution for the feedforward and feedback filters minimizes the quantity $$MSE = E\left[\sum_{n=0}^{N-1} (z(n) - x(n))^2\right]$$

where the expectation operator, E, refers to the random noise at the slicer input, which results from the additive Gaussian noise 577, filtered through the antialiasing filter 573, sampled 574, and filtered by the feedforward filter 585. (Here MSE is actually N times the mean-squared error when averaged over the input sequence $\{x(n)\}$.) The algorithm finds the optimal W vector, B vector, and equalizer delay DT such that the mean-squared error is minimized in an efficient manner, for example as described in P. A. Voois, I. Lee, and J. M. Cioffi, "The effect of decision delay in finite-length decision feedback equalization," *IEEE Transactions on Information Theory*, vol. 53, pp. 618-621, March 1996, which is incorporated herein by reference. The optimal sampling phase φ for the T/2 sampler is found by a brute-force search over the 16 sampling phases in the unit interval. Note that for a sufficiently long equalizer, that is, for $N_f$ and $N_b$ sufficiently large, the MSE is insensitive to sampling phase and equalizer delay. In that case, the number of anticausal taps 2D can be set to $N_f/2$, for example, and optimization over D and φ can be omitted. Further details of the mean squared error (MSE) minimization are given below.

5. Once the MSE is minimized by finding the optimal sampling phase, equalizer delay, and tap coefficients, the bit-error rate is calculated by the semi-analytic method. In an actual receiver, the slicer would make binary decisions on its input based on whether the input is greater than or less than the slicer threshold. The probability of making an error depends on the amplitude of the input signal, the statistics of the input noise, and the threshold of the slicer, which for this example is set to ½. The overall bit-error rate is calculated as follows:

a. The Gaussian noise variance at the input to the slicer 578 is calculated.
  b. For each bit in the data test pattern, the equalized input signal to the slicer 578 is calculated and the probability of error calculated based on the amplitude of the input signal, the variance of the input noise, and the threshold value.
  c. The probabilities of error are averaged over all bits in the data test pattern to compute a total probability of error $BER_X$.

6. The equivalent SNR in optical dB is derived from the $BER_X$ according to $$SNR_X = 10 \log_{10}(Q^{-1}(BER_X))(dBo) \qquad (13)$$

7. The $dWDP_M$ for the receiver module under test is equal to the difference (in optical dB) between $WDP_{out}$ and $WDP_{in}$, which can be equivalently calculated as the difference between $SNR_{in}$ and $SNR_{out}$ as shown in Eqn. 11 above.

There are additional alternate embodiments that are related to the example algorithm described above. For example, the algorithm described above minimizes MSE at the slicer input, since that is how most practical equalizers are implemented. Alternatively, the reference receiver could minimize bit error rate (BER) or some other performance metric to compute the receiver module penalty. Minimization of BER would not necessarily result in the same penalty as that computed by minimizing mean squared error.

Automated offset optimization is now discussed in additional detail. In one embodiment, the WDP algorithm corrects for inaccuracies in the estimated value of the baseline (or steady state zero level). This automated offset method makes the reported WDP (or SNR) value independent of estimation error in the baseline. In fact, it obviates the need to measure a baseline at all provided the ratio of baseline value to OMA is not unreasonably large. After OMA normalization and subtraction of the estimated baseline, the resulting normalized waveform has target signal values of "0" and "1". The slicer threshold for BER determination is set at ½. An error in baseline estimation such that the resulting waveform is improperly offset and not centered about ½ will result in a higher BER than if the offset were optimized. This offset optimization can be alternatively viewed as a threshold optimization.

The automated offset optimization can be accomplished by extending the vector of feedforward equalizer tap coefficients by 1. The additional tap is not fed by a delayed version of the received signal, but is instead fed by the constant 1. FIG. 8 shows an example feedforward filter with $N_f$ regular taps and an extra $(N_f+1)^{th}$ for offset optimization. The MMSE tap coefficients are then calculated in the normal fashion, and the coefficient of the extra tap essentially gives the offset that minimizes mean squared error with the target signal values. While this method has been described as adjustment of an extra tap in the FFE to minimize MSE, other methods could be used to add an offset constant, the value of which is optimized in some sense. For example, one alternate method extends the length of the feedback tap coefficient vector by one, feeding that extra feedback tap by the constant 1, and computing the offset as part of the feedback tap coefficient vector.

FIGS. 4-8 illustrated several examples for quantifying the noise performance and the distortion performance of a receiver module, using the quantities of relative noise $RN_M$ and Differential Waveform and Dispersion Penalty $dWDP_M$ for the 10GBASE-LRM standard as an example. These measurements can be used to determine compliance with standards in a number of ways.

In one approach, a standard can set a separate limit for RN and for dWDP. In one example shown in FIG. 9, boundary 910 defines the standard. The standard requires that $RN_M<0.033$ and $dWDP_M<0.5$ dB. The area of compliance is the rectangular area 912. In an alternate approach, the curve 920 defines the standard. The region 922 on the origin-side of curve 920 is the compliance region. Receiver modules that fall within this area 922 are in compliance. The border 920 could be defined as a contour of constant BER. In other words, all points along the curve 920 would have the same BER. That BER could be achieved by lower distortion and higher noise, higher distortion and lower noise, or some tradeoff of the two. The area inside the curve (i.e., towards the origin) represents lower BER.

In another approach, refer again to FIG. 7. In this model for calculating dWDP, the noise source 577 is a reference white noise and does not take into account the actual noise of the receiver module. In other words, the noise 577 used to calculate $SNR_X$ (or, equivalently $WDP_X$) is the same noise as is used to calculate $RN_X$. Thus, $dWDP_M$ calculated in this manner is largely independent of the actual noise in the receiver module.

In an alternate approach, actual noise measurements are used to calculate $WDP_{out}$ in FIG. 7 (and then $dWDP_M$). For example, when calculating $WDP_{out}$, the noise model 577 may be supplemented or replaced by actual noise measurements. When calculated in this manner, $dWDP_M$ is a function of the noise in the receiver module and is a hybrid measure of both distortion and noise, rather than primarily just distortion. The standard could be defined with respect to just this one hybrid quantity, for example requiring $dWDP_M$ measured in this way to fall below a maximum. Alternately, the standard could be defined with respect to this hybrid $dWDP_M$ in addition to other measures of distortion and/or noise.

As another example, the dWDP algorithm described above uses a test signal 540 that includes various effects from a single optical fiber reference channel. Alternatively, a number of different effects and/or optical fiber reference channels may be simulated by using a set of test signals 540. A dWDP is calculated for each test signal. Receiver module compliance can be defined in terms of the collection of dWDP values. For example, compliance can require that a certain percentage of the dWDP values be below some threshold (or meet the specific requirements of the standard). In particular, all of the dWDP values could be required to be below some limit. Alternately, different requirements could be defined for different reference channels or classes of reference channels. It will be readily apparent that many different compliance criteria can be defined, all of which should be considered within the scope of this invention.

The actual quantitative limits for RN and/or dWDP (or other measurements of receiver module noise and/or distortion) will depend on the specific application and standard. The following is one example approach for determining appropriate quantitative limits for LRM.

Beginning with RN, during the development of fiber optic standards, an optical power budget is typically developed. The budget generally considers transmit powers, receiver sensitivity, DC losses due to fibers and connectors, AC penalties due to dispersion and noises, and possibly some margin. The terms in the budget produce a target Q factor (peak to rms SNR) at the slicer input of the receiver that is sufficient to attain a required BER. With signal-independent additive Gaussian noise assumptions, for example, the target Q factor, $Q_{sens}$, is 8.47 dB optical to attain BER=1E-12.

Receiver sensitivity is a measure of receiver noise and is usually defined in terms of signal strength of a perfect (no noise and no distortion) NRZ input signal with which the target Q factor must be achieved. The signal is commonly expressed in units of dBm, OMA, although other units are possible. For example, LRM has budgeted a practical receiver sensitivity of ~12.6 dBm, OMA. Standards bodies typically assume that the noise magnitude that corresponds to receiver sensitivity is independent of the input signal level.

In LRM, -6.5 dBm is the minimum OMA expected in an actual application and sets the minimum OMA used for receiver testing. The minimum OMA is (-6.5--12.6)=6.1 dB greater than the budgeted receiver sensitivity value. With these assumptions for test OMA and sensitivity, and still assuming a perfect input test signal with no noise, it is expected that $$Q_{minOMA} = Q_{sens} + 6.1 = 14.57 \text{ dB(optical)}.$$

Further, assume that the rest of the receiver is perfect and that the noise limitation on sensitivity occurs entirely within the receiver module. With the same assumptions, the Q factor at the receiver module output would be $$Q_M = Q_{minOMA} = 14.57 \text{ dB}.$$

Since $RN_M = 1/Q_M$, then $$RN_M = -14.57 \text{ dB} = 0.035 \quad (14)$$

This is the value imposed on the module receiver to just meet the target Q factor requirements of the LRM budget. Name this $RN_{target}$. Any value of $RN_M$ that is lower than this value would increase SNR and would be considered compliant. That is, in one approach, the standard could require $$RN_M < RN_{target} \quad (15)$$

where $RN_M$ is RN for the receiver module under test and $RN_{target} = 0.035$.

In practice, the rest of the receiver is not perfect. Therefore, the module must perform better than $RN_{target}$ so that the entire receiver meets the requirement of $RN_{target}$. For example, in FIG. 9, the maximum $RN_M$ is set at 0.033. Further, $RN_{target}$ may be dependent on the module's dWDP in a tradeoff scenario.

Turning now to distortion, in the standards budgeting process, assumptions about the performance of the receiver are made. In the case of equalizing receivers, a configuration and performance such as number of taps, resolution, and other attributes may be assumed. This receiver is referred to as a reference receiver. If an actual receiver has the same properties as the reference receiver, and the input signal contains the same signal strength, noise, and penalty characteristics as those assumed during the budgeting process, then the link should result in the same SNR or BER level as in the budget.

However, unlike noise performance (e.g., $RN_M$), no exact quantitative rule currently exists for setting distortion limits (e.g., $dWDP_M$) for the receiver module. Often, distortion performance and the corresponding costs can be traded off between the receiver module and the host receiver.

Assume that the budget has margin M (in dB) for the overall system. In some cases, for example LRM, a portion $M_{Rx}$ of the overall margin is allocated to the receiver to allow for implementation penalties, where the reference receiver that is assumed is better than ones expected in practice. With this approach, the actual receiver is allowed up to $M_{Rx}$ dB worse performance than the reference receiver while still supporting $Q_{sens}$ at the slicer input.

Some of $M_{Rx}$ may be allocated to the receiver module $dWDP_M$. For example, if $M_{Rx}=2.5$ dB for the receiver, 0.5 dB might be allowed for $dWDP_M$. This would leave 2.0 dB for other receiver implementation penalties, $M_{RxOther}$. 0.5 dB is merely an example. Other values may be chosen depending on receiver module and host receiver tradeoffs. The receiver module has consumed some of $M_{Rx}$, and so the performance of the host receiver must be accordingly better in order to meet the overall receiver margin $M_{Rx}$. This is verified in testing by applying a more stressful test signal to the host receiver that includes the distortion added by the receiver module, while requiring that the host receiver still meet its SNR or BER specifications.

It is possible to allow more to $dWDP_M$ if the specifications for the receiver module recognize that the module's sensitivity ($RN_M$ performance) could be better than budgeting expectations. In this situation, it is possible that the penalty as seen at the slicer input due to a larger $dWDP_M$ can be offset by lower $RN_M$, thus preserving more margin for $M_{RxOther}$. Likewise, a lower $dWDP_M$ could allow a higher value for $RN_M$, etc.

In other cases, it may be expected that actual receivers perform better than the reference receiver. In this case, there is usually no margin allocated in the original budget or for receiver implementation. That is, budget for actual receivers may already exist for $dWDP_M$, even though not explicitly allocated. This case can be tested by applying a more stressful test signal to the host receiver that includes the distortion added by the receiver module, while requiring that the host receiver still meet its SNR or BER specifications. This effectively forces that the host receiver has a better receiver than assumed for the host's reference receiver in the budget.

Figure 10:
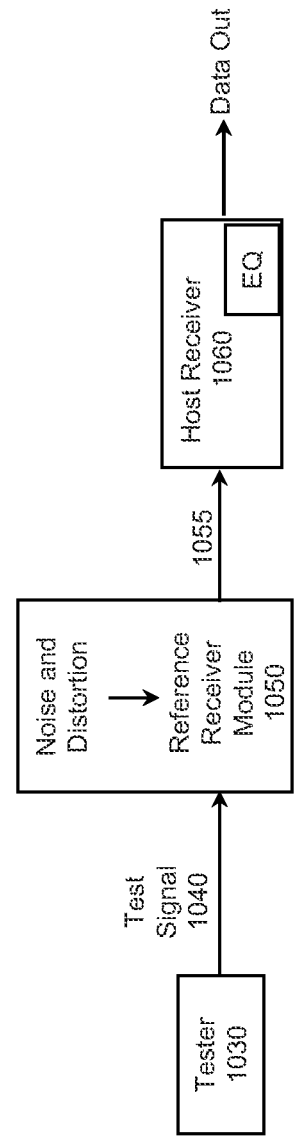
FIG. 10 is a block diagram of an example test system for testing a host receiver.

Turning now to testing of the host receiver, FIG. 10 is a block diagram of a test system for testing a host receiver. Current standards may specify a test signal to be applied to the input of a receiver (i.e., the input to the receiver module) and a required performance at the output of the receiver (i.e., the output of the host receiver). However, the system in FIG. 10 is intended to test just the host receiver without a specific receiver module.

This is accomplished in effect by using a reference receiver module 1050. For example, if the standard specifies a receiver test signal 1040, then the tester 1030 generates this test signal 1040 and the reference receiver module 1050 adds noise and distortion. The resulting intermediate test signal 1055 is then applied to the host receiver under test 1060. The performance of the host receiver 1060 is compared to the standard to determine whether the host receiver 1060 complies. FIG. 10 shows the reference receiver module 1050 as a separate box. This is done to illustrate the net effect but the actual implementation may achieve the same effect without a separate reference receiver module 1050. That is, test equipment may directly generate the intermediate test signal 1055 with similar characteristics to that which would be produced by a reference receiver when fed by the receiver test signal 1040; an actual physical realization of the reference receiver module 1050 may not be implemented in practice.

Figure 9:
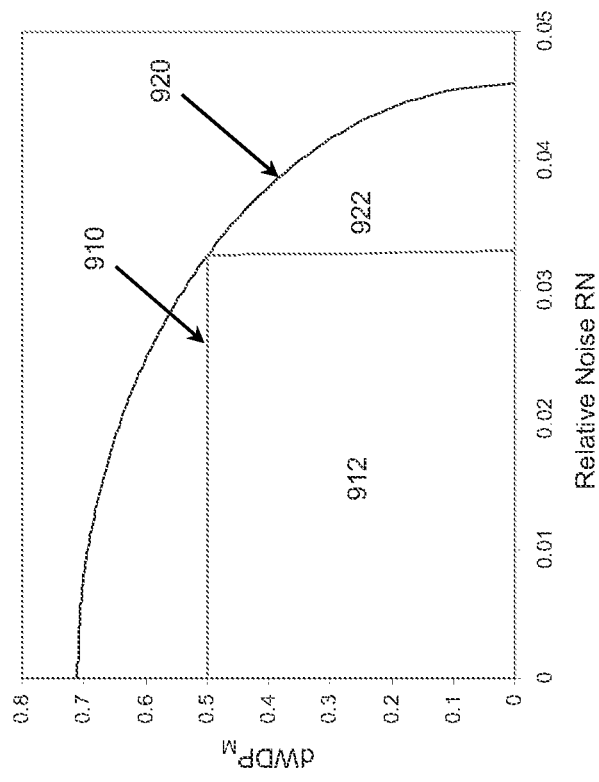
FIG. 9 is a diagram illustrating an example tradeoff approach that could be taken by various standards to allow a wider range of performance between noise and distortion of the receiver module.

For example, to continue the LRM example from above, assume that the standard for the receiver module was defined by boundary 910 in FIG. 9. That is, $RN_M < 0.033$ and $dWDP_M < 0.5$ dB in order for the receiver module to be compliant. Then one approach to testing the host receiver 1060 is to add the maximum allowable module noise and module distortion (i.e., $RN_M$ of 0.033 and $dWDP_M$ of 0.5 dB) to a test signal 1040 specified for the overall receiver. The VMA range preferably would be set over the range allowed by the standard or expected in the field. The resulting signal 1055 is then used as the input test signal for the host receiver 1160. Usually, the standard may define a maximum BER at the output of the host receiver 1160.

As another example, if the standard was defined by boundary 920 in FIG. 9, the host receiver 1060 could be tested by applying different combinations of $RN_M$ and $dWDP_M$ to the receiver test signal 1040, thus testing the host receiver at different points along the boundary 920.

The detailed description above provides methods for testing host receivers and receiver modules that may be supplied by different manufacturers. It is possible that these methods could form the basis of a standard that defines compliance criteria to ensure interoperability. Simplified tests may be derived for use in production when the results of such tests are well correlated with the results of the tests described here. For example, a limit on dWDP may correlate well with a limit on the total harmonic distortion introduced by a module, and a simplified total harmonic distortion test might be used in production to reduce test time. The scope of the current invention is intended to cover such methods when the underlying compliance criteria are based of the methods described herein.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method for testing an element of a communication link, the method comprising:
    measuring an output waveform for the element under test, wherein the output waveform is generated by the element under test in response to a input test signal applied to the element under test;
    processing, by a processor, the output waveform to simulate propagation of the output waveform through a reference receiver to generate a simulated propagated output waveform, the processing including equalizing the output waveform using an equalizer having a plurality of equalizer coefficients set to minimize a first error metric between the simulated propagated output waveform and the input test signal; and
    determining a noise performance metric of the element under test based on the simulated propagated output waveform.

2. The method of claim 1, wherein the first error metric comprises a mean-squared error between the simulated propagated output waveform and the input test signal.

3. The method of claim 1, wherein the first error metric comprises a bit error rate between the simulated propagated output waveform and the input test signal.

4. The method of claim 1, wherein equalizing the output waveform comprises:
    applying a feedback decision equalization to the output waveform.

5. The method of claim 1, wherein equalizing the output waveform comprises:

filtering the output waveform with a feedforward filter comprising a first subset of the plurality of equalizer coefficients;
filtering the input test signal with a feedback filter comprising a second subset of the plurality of equalizer coefficients; and
combining outputs of the feedforward and feedback filters.

6. The method of claim 5, wherein filtering the output waveform with the feedforward filter comprises:
    filtering the output waveform using a first plurality of regular feedforward coefficients to generate a first filtered signal;
    combining the first filtered signal with a constant offset coefficient to generate the output of the feedforward filter.

7. The method of claim 6, further comprising:
    adjusting the constant offset coefficient to automatically optimize an offset.

8. The method of claim 1, further comprising:
    measuring an input waveform for the element under test, wherein the input waveform is based on the input test signal applied to the element under test;
    processing, by a processor, the input waveform, to simulate propagation of the input waveform through the reference receiver to generate a simulated propagated input waveform,
    wherein determining the noise performance metric is further based on a second error metric representing an error between the simulated propagated output waveform and the simulated propagated input waveform.

9. The method of claim 8, wherein the second error metric comprises a bit error rate between the simulated propagated output waveform and the simulated propagated input waveform.

10. The method of claim 8, wherein determining the noise performance metric comprises:
    determining an equivalent signal-to-noise ratios for each of the input test signal and the simulated propagated output waveform based on the second error metric; and
    determining waveform and dispersion penalties (WDPs) for each of the input test signal and the simulated propagated output waveform; and
    determining the noise performance metric based on a difference between the WDPs for the input test signal and the simulated propagated output waveform.

11. A non-transitory computer-readable storage medium storing computer-executable instructions for testing an element of a communications link, the instructions when executed by a processor causing the processor to perform steps including:
    measuring an output waveform for the element under test, wherein the output waveform is generated by the element under test in response to a input test signal applied to the element under test;
    processing the output waveform to simulate propagation of the output waveform through a reference receiver to generate a simulated propagated output waveform, the processing including equalizing the output waveform using an equalizer having a plurality of equalizer coefficients set to minimize a first error metric between the simulated propagated output waveform and the input test signal; and
    determining a noise performance metric of the element under test based on the simulated propagated output waveform.

12. The non-transitory computer-readable storage medium of claim 11, wherein the first error metric comprises a mean-squared error between the simulated propagated output waveform and the input test signal.

13. The non-transitory computer-readable storage medium of claim 11, wherein the first error metric comprises a bit error rate between the simulated propagated output waveform and the input test signal.

14. The non-transitory computer-readable storage medium of claim 11, wherein equalizing the output waveform comprises:
applying a feedback decision equalization to the output waveform.

15. The non-transitory computer-readable storage medium of claim 11, wherein equalizing the output waveform comprises:
filtering the output waveform with a feedforward filter comprising a first subset of the plurality of equalizer coefficients;
filtering the input test signal with a feedback filter comprising a second subset of the plurality of equalizer coefficients; and
combining outputs of the feedforward and feedback filters.

16. The non-transitory computer-readable storage medium of claim 15, wherein filtering the output waveform with the feedforward filter comprises:
filtering the output waveform using a first plurality of regular feedforward coefficients to generate a first filtered signal;
combining the first filtered signal with a constant offset coefficient to generate the output of the feedforward filter.

17. The non-transitory computer-readable storage medium of claim 16, further comprising instructions for adjusting the constant offset coefficient to automatically optimize an offset.

18. The non-transitory computer-readable storage medium of claim 11, further comprising:
measuring an input waveform for the element under test, wherein the input waveform is based on the input test signal applied to the element under test;
processing, by a processor, the input waveform, to simulate propagation of the input waveform through the reference receiver to generate a simulated propagated input waveform,
wherein determining the noise performance metric is further based on a second error metric representing an error between the simulated propagated output waveform and the simulated propagated input waveform.

19. The non-transitory computer-readable storage medium of claim 18, wherein the second error metric comprises a bit error rate between the simulated propagated output waveform and the simulated propagated input waveform.

20. The non-transitory computer-readable storage medium of claim 18, wherein determining the noise performance metric comprises:
determining an equivalent signal-to-noise ratios for each of the input test signal and the simulated propagated output waveform based on the second error metric; and
determining waveform and dispersion penalties (WDPs) for each of the input test signal and the simulated propagated output waveform; and
determining the noise performance based on a difference between the WDPs for the input test signal and the simulated propagated output waveform.

* * * * *